United States Patent
Pasquero

(10) Patent No.: US 8,953,845 B2
(45) Date of Patent: Feb. 10, 2015

(54) LOGIN METHOD BASED ON DIRECTION OF GAZE

(71) Applicant: BlackBerry Limited, Waterloo (CA)

(72) Inventor: Jerome Pasquero, Montreal (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/030,393

(22) Filed: Sep. 18, 2013

(65) Prior Publication Data

US 2014/0020091 A1    Jan. 16, 2014

Related U.S. Application Data

(63) Continuation of application No. 13/052,226, filed on Mar. 21, 2011, now Pat. No. 8,625,847.

(51) Int. Cl.
*G06K 9/00* (2006.01)
*G06F 21/32* (2013.01)
*G06F 3/01* (2006.01)
*G06F 21/36* (2013.01)

(52) U.S. Cl.
CPC ............... *G06F 21/32* (2013.01); *G06F 3/013* (2013.01); *G06K 9/00597* (2013.01); *G06F 21/36* (2013.01)
USPC ........................................................ 382/103

(58) Field of Classification Search
None
See application file for complete search history.

(56) References Cited

U.S. PATENT DOCUMENTS

| | | | |
|---|---|---|---|
| 5,559,961 A | 9/1996 | Blonder | |
| 6,282,553 B1 | 8/2001 | Flickner et al. | |
| 6,677,969 B1 | 1/2004 | Hongo | |
| 6,720,860 B1 | 4/2004 | Narayanaswami | |
| 7,272,380 B2 | 9/2007 | Lee et al. | |
| 7,986,816 B1 | 7/2011 | Hoanca et al. | |
| 8,077,915 B2 | 12/2011 | Thorn | |
| 8,274,578 B2 | 9/2012 | Hong et al. | |
| 8,342,687 B2 | 1/2013 | Blixt et al. | |
| 2003/0076300 A1 | 4/2003 | Lauper et al. | |
| 2009/0097705 A1 | 4/2009 | Thorn | |
| 2009/0258667 A1 | 10/2009 | Suzuki et al. | |
| 2011/0248987 A1 | 10/2011 | Mitchell | |

(Continued)

FOREIGN PATENT DOCUMENTS

| | | |
|---|---|---|
| GB | 2313460 A | 11/1997 |
| WO | 2006064241 A2 | 6/2006 |

(Continued)

OTHER PUBLICATIONS

Examiner's Report for European Patent Application No. 11159029.5 dated Oct. 29, 2013.

(Continued)

*Primary Examiner* — Shervin Nakhjavan
(74) *Attorney, Agent, or Firm* — Ridout and Maybee LLP

(57) ABSTRACT

A method of authenticating a user of a computing device is proposed, together with computing device on which the method is implemented. A plurality of objects is displayed on a display screen. The plurality of objects includes at least objects that make up a plurality of objects of the user's passcode. In response to a trigger signal an image of the user's face is captured while looking at one of the objects on the display screen. A determination of which object is in the direction of the user's gaze is made from the image and whether or not the gaze is on an object which is part of the passcode. A plurality of trigger signals may be generated to capture a plurality of images.

20 Claims, 9 Drawing Sheets

(56) References Cited

U.S. PATENT DOCUMENTS

2011/0273369 A1   11/2011   Imai et al.
2012/0023574 A1    1/2012   Osborn et al.

FOREIGN PATENT DOCUMENTS

WO       2007017500 A1   2/2007
WO       2010003410       1/2010

OTHER PUBLICATIONS

Office Action for Canadian Patent Application No. 2,769,898 dated Oct. 4, 2013.
Extended European Search Report on corresponding European Patent Application No. 11159029 issued Aug. 31, 2011; 5 pages.
Kumar et al.; "Reducing Shoulder-surfing by Using Gaze-based Password Entry"; SOUPS 2007; Jul. 18-20, 2007; Pittsburgh, PA, USA; 7 pages.
De Luca et al.; "Evaluation of Eye-Gaze Interaction Methods for Security Enhanced PIN-Entry"; OzCHI 2007; Nov. 28-30, 2007; Adelaide, Australia; 4 pages.
Forget et al.; "Input Precision for Gaze-Based Graphical Passwords"; CHI 2010; Apr. 10-15, 2010; Atlanta, Georgia, USA; 6 pages.
Grifantini, Kristina; "Eye Tracking for Mobile Control"; Technology Review; Published by MIT; Available online; http://www.technologyreview.com/computing/25369/; printed Jan. 25, 2011; 4 pages.
Miluzzo et al.; "EyePhone: Activating Mobile Phone With Your Eyes"; Computer Science Department, Dartmouth College; MobiHeld 2010; Aug. 30, 2010; New Delhi, India; 6 pages.
Nagamatsu et al.; "MobiGaze Development of a Gaze Interface for Handheld Mobile Devices"; CHI 2010; Apr. 10-15, 2010; Atlanta, Georgia, USA; pp. 3349-3354.
Lukander, Kristian; "A system for tracking gaze on handheld devices"; Behavior Research Methods; 2006, 38(4); pp. 660-666; 2006 Psychology Society, Inc.
Open source eye tracking development blog; Gaze tracker development; Available online; http://www.gazegroup.org/develop/; printed Jan. 25, 2011; 7 pages.
Research; Development of Gaze Tracking Technology; Available online; http://www.gazegroup.org/research?tmpl=component&print=1&page=; printed Jan. 25, 2011; 3 pages.

LOGIN METHOD BASED ON DIRECTION OF GAZE

CROSS-REFERENCE TO RELATED APPLICATIONS

The present application is a continuation of U.S. patent application Ser. No. 13/052,226 filed Mar. 21, 2011.

TECHNICAL FIELD

The present disclosure relates generally to authentication using direction of gaze.

BACKGROUND

Passcodes may be used in many situations where a user needs to be authenticated. Situations requiring authentication may include the ability to access or use a computer, mobile phone, PDA, or any other device. They may also enable access to a physical location, or allow use of a credit/debit card or similar instrument. Passcodes are typically alphanumeric strings or sequences entered on a keyboard.

Eye-tracking technology can be used to select objects on a screen. The eye-tracking system tracks the gaze of a user and determines which object the user is looking at.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
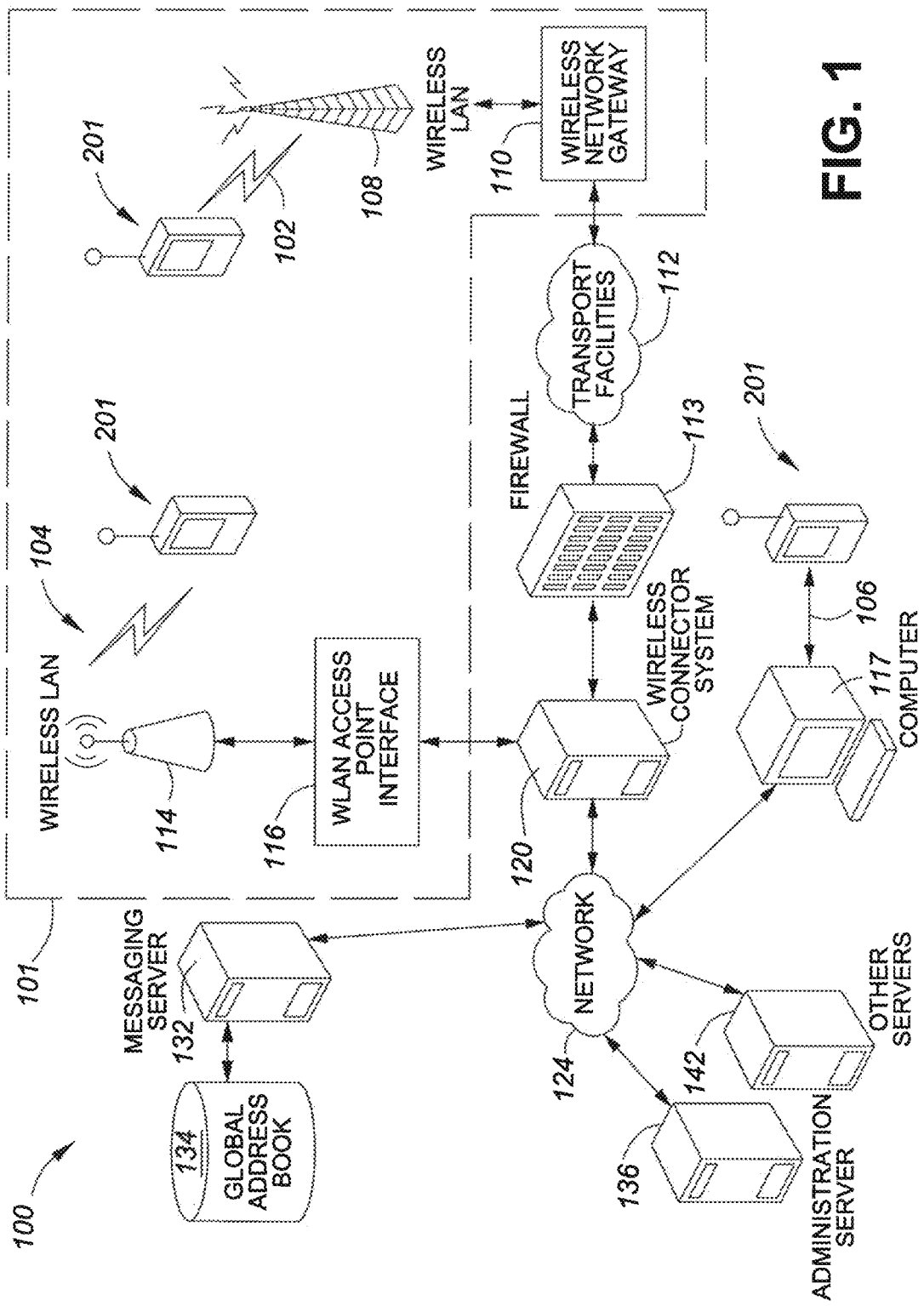
FIG. 1 is a block diagram illustrating a communication system including a mobile communication device in which example embodiments of the present disclosure can be applied.

The present application proposes a method for authenticating a user of a computing device in which a determination is made of where the user's gaze is directed from an image that is captured in response to a trigger signal such as the activation of a single input interface, such as a button. In general, a plurality of objects is displayed on a display screen. The plurality of objects includes at least objects that make up a sequence of objects pre-selected as the user's passcode. A determination of which object is in the direction of the user's gaze is made from the photograph and whether or not the gaze is on the correct object in the sequence of the passcode. This is repeated for each object in the sequence of the passcode.

The methods disclosed make third party determination of a user's passcode by "shoulder surfing" or other means difficult. Typically, if the observer can see the user's eyes, the observer can not see the display at which the user is gazing. Likewise, if the observer can see the display, they likely can not see the user's eyes.

In one aspect, there is provided one or more computer readable media having computer readable instructions stored thereon that when executed by a processor implement a method of user authentication at a computing device, the method comprising: displaying a plurality of objects on a display screen, the plurality of objects comprising objects that have been pre-selected as part of passcode, the passcode comprising a sequence of the pre-selected objects; for each object in the sequence of the passcode, receiving a trigger signal; in response to the trigger signal, causing an image sensor to capture an image; analysing the image to determine a direction of gaze; determining the object on the display screen that corresponds to the direction of gaze; determining whether the object that corresponds to the direction of the gaze matches the object in the sequence; and after the photographs have been analysed for all objects of the sequence, determining if a threshold for has been exceeded and if the threshold has been exceeded indicating positive authentication.

In another aspect, there is provided method of user authentication at a computing device, the method comprising: displaying a plurality of objects on a display screen, the plurality of objects comprising objects that have been pre-selected as part of passcode, the passcode comprising a sequence of the pre-selected objects; for each object in the sequence of the passcode, receiving a trigger signal; in response to the trigger signal, causing an image sensor to capture an image; analysing the image to determine a direction of gaze; determining the object on the display screen that corresponds to the direction of gaze; determining whether the object that corresponds to the direction of the gaze matches the object in the sequence; and after the photographs have been analysed for all objects of the sequence, determining if a threshold for matches has been exceeded and if the threshold has been exceeded indicating positive authentication.

In another aspect, there is provided a computing device comprising: a processor; a display; an image sensor; input interface for receiving a trigger signal causing the image sensor to capture an image; and one or more computer readable media having computer readable instructions stored thereon that when executed by the processor implement a method of user authentication at the computing device, the method comprising: displaying a plurality of objects on a display screen, the plurality of objects comprising objects that have been pre-selected as part of a passcode, the passcode comprising a sequence of the pre-selected objects; for each object in the sequence of the passcode, receiving the trigger signal; in response to the trigger signal, causing the image sensor to capture an image; analysing the image to a direction of gaze; determining which object on the display screen corresponds to the direction of gaze; determining whether the object that corresponds to the direction of the gaze matches the object in the sequence; and after the photographs have been analysed for all objects of the sequence, determining if a threshold number of matches has been exceeded and if the threshold has been exceeded indicating positive authentication.

Embodiments of the present application are not limited to any particular operating system, mobile device architecture, server architecture, or computer programming language.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile communication devices 201 in the wireless network 101, and an application server for implementing server-based applications.

The global address book 134 comprises electronic contact records generated and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
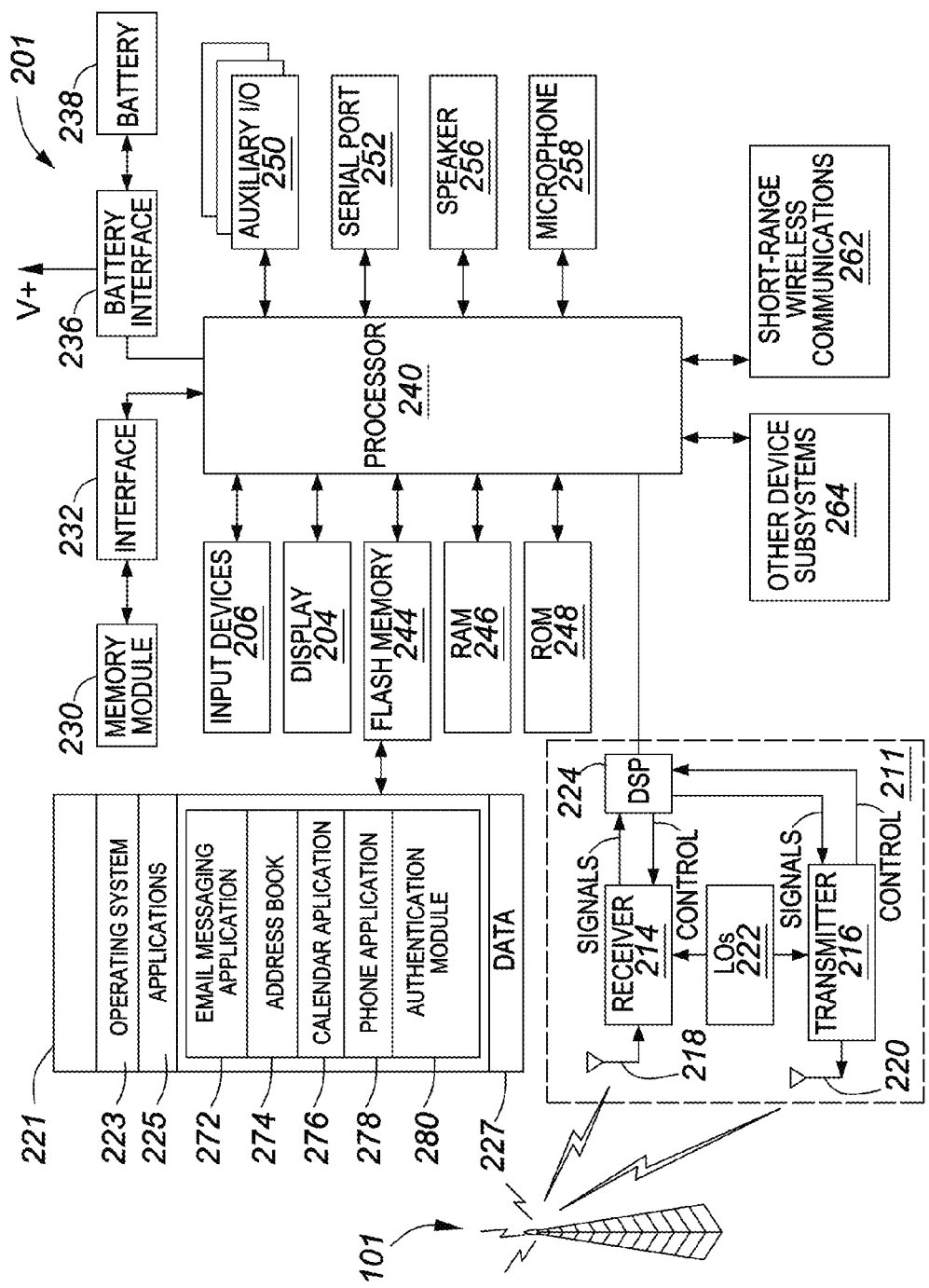
FIG. 2 is a block diagram illustrating a mobile communication device in accordance with one example embodiment of the present disclosure.

Reference is now made to FIG. 2 which illustrates an exemplary embodiment of the mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone, a tablet device or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and an authentication module 280. Example embodiments of the authentication module 280 will be discussed in detail later herein. It is recognized that the authentication module 280 and its various components as described herein can form a discrete module running on the device 201, or the functions of the authentication module 280 can be distributed on the device 201 as separate modules or integrated within other existing modules as desired. Such discrete or distributed implementations all fall within the embodiments of the authentication module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Figure 3:
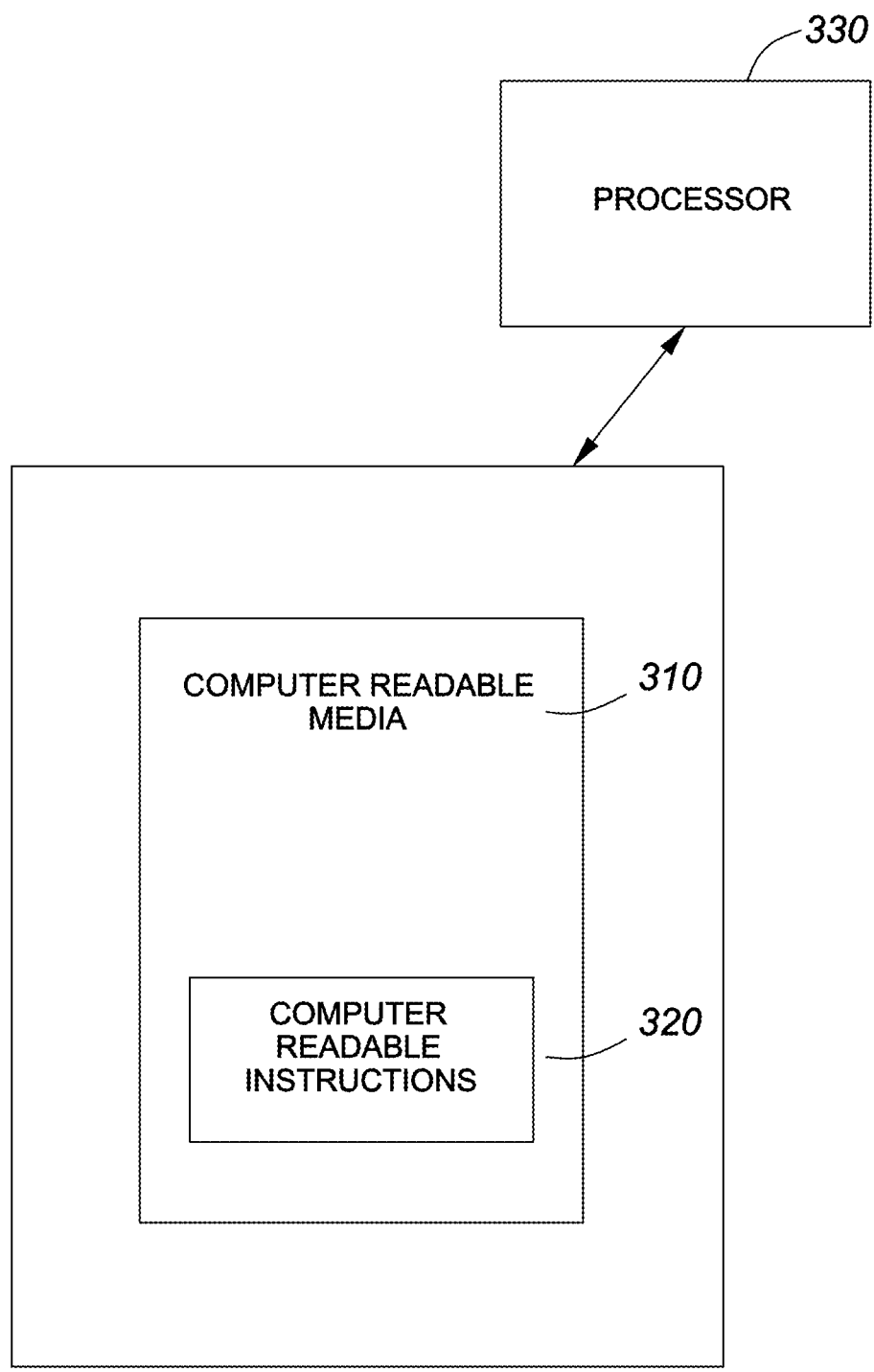
FIG. 3 is a block diagram illustrating a computer readable medium in accordance with one example embodiment of the present disclosure.

Referring now to FIG. 3, an exemplary computer readable media 310 will be described. The computer readable media 310 have computer readable instructions 320 stored thereon that when implemented cause a processor 330 to execute any one of the methods described herein. For the purposes of the application, computer readable media comprise any tangible computer storage, such as but not limited to flash memory, read only memory, CD, DVD, and memory sticks. Authentication module 280 described above with reference to FIG. 2 is an exemplary implementation of computer readable media 310. However, it is to be understood that the computer readable media 310 is not limited to use on mobile devices, such as mobile device 210 described above. Non-limiting examples of the processor 330 include a CPU (central processing unit) on a personal computer, laptop computer, tablet device, personal digital assistant (PDA), mobile telephone, smart phone, bank machine, and digital authentication system for entry to rooms or buildings, or control system. Any device with a processor, a display and a user interface enabling a user to move images on the display could feasibly make use of the computer readable media 310 to authenticate users.

Figure 4:
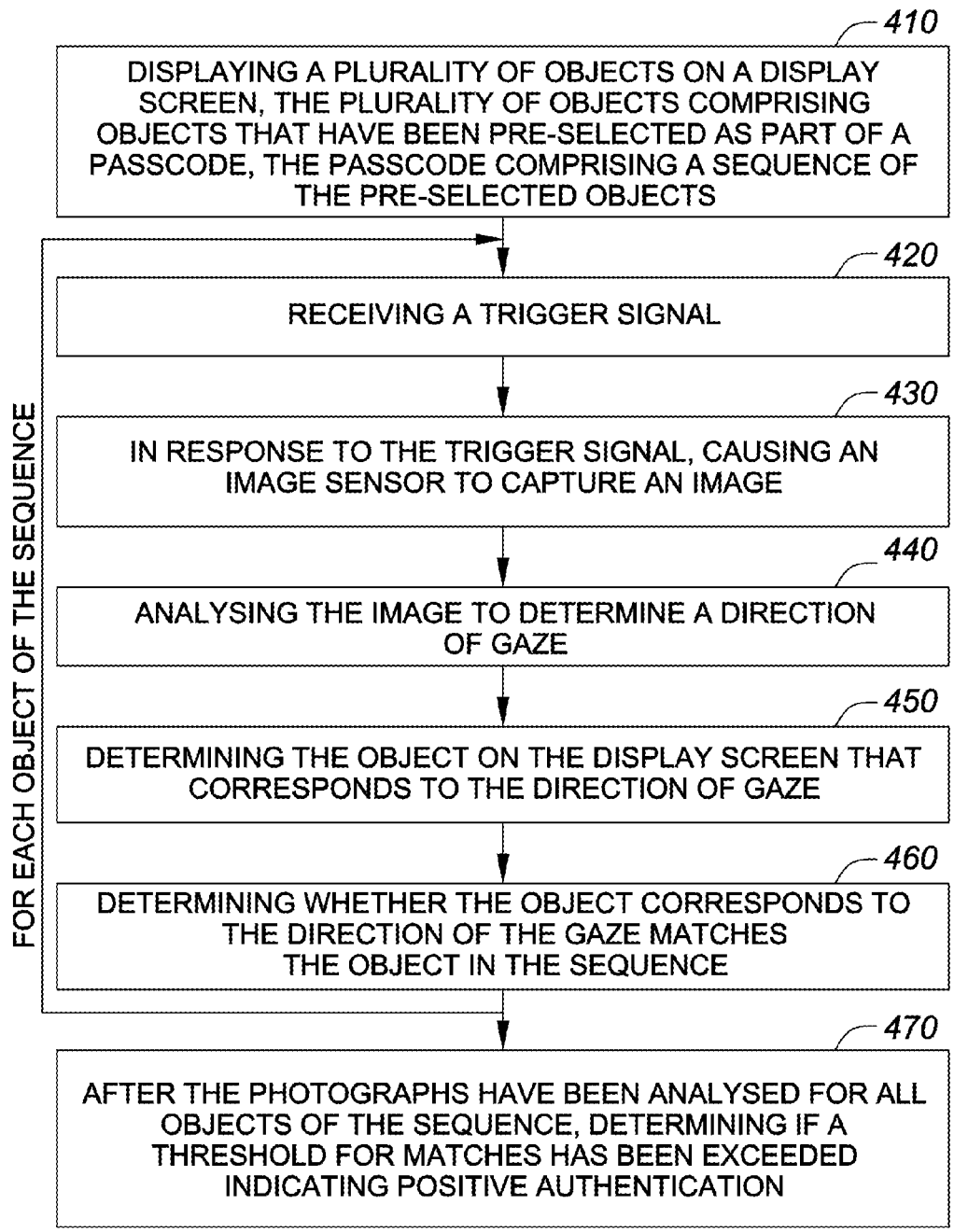
FIG. 4 is a flowchart illustrating a method in accordance with one example embodiment of the present disclosure.

Referring now to FIG. 4, a method of authenticating a user of a computing device will now be described.

Figure 5:
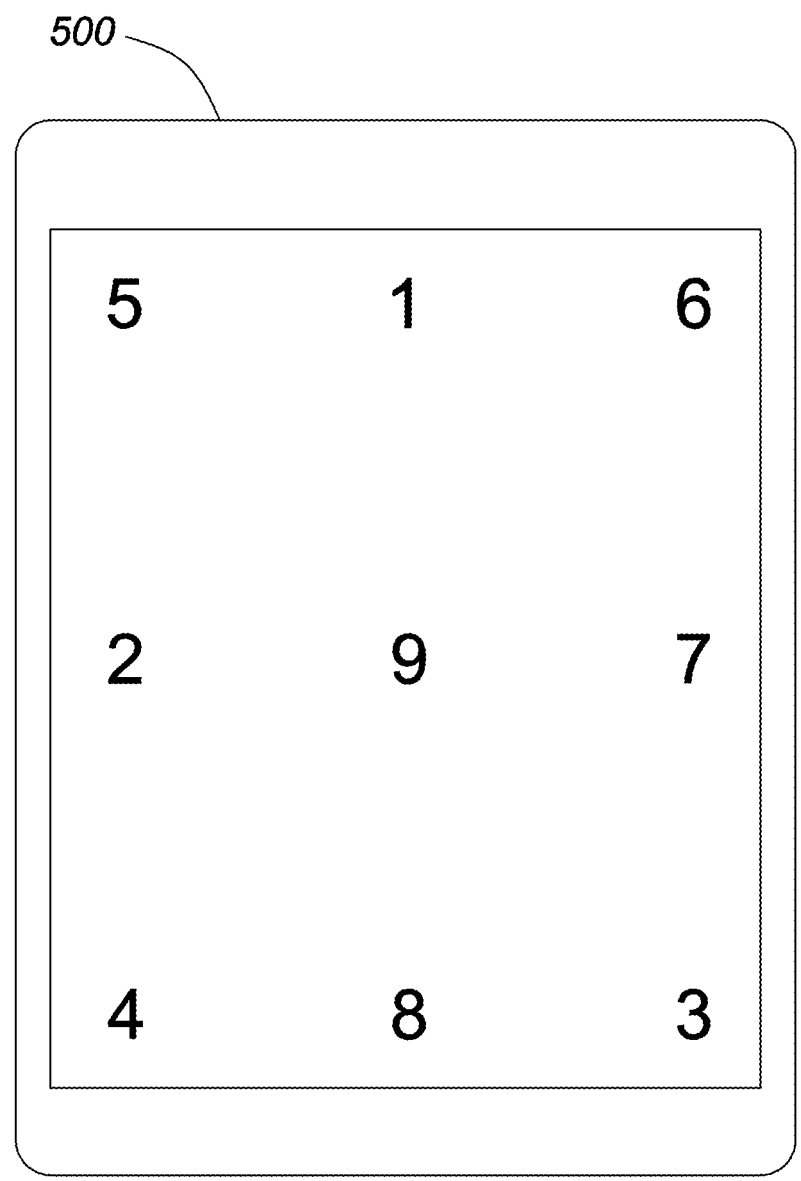
FIG. 5 is a screen shot of digits displayed for authentication in accordance with one example embodiment of the present disclosure.
Figure 6:
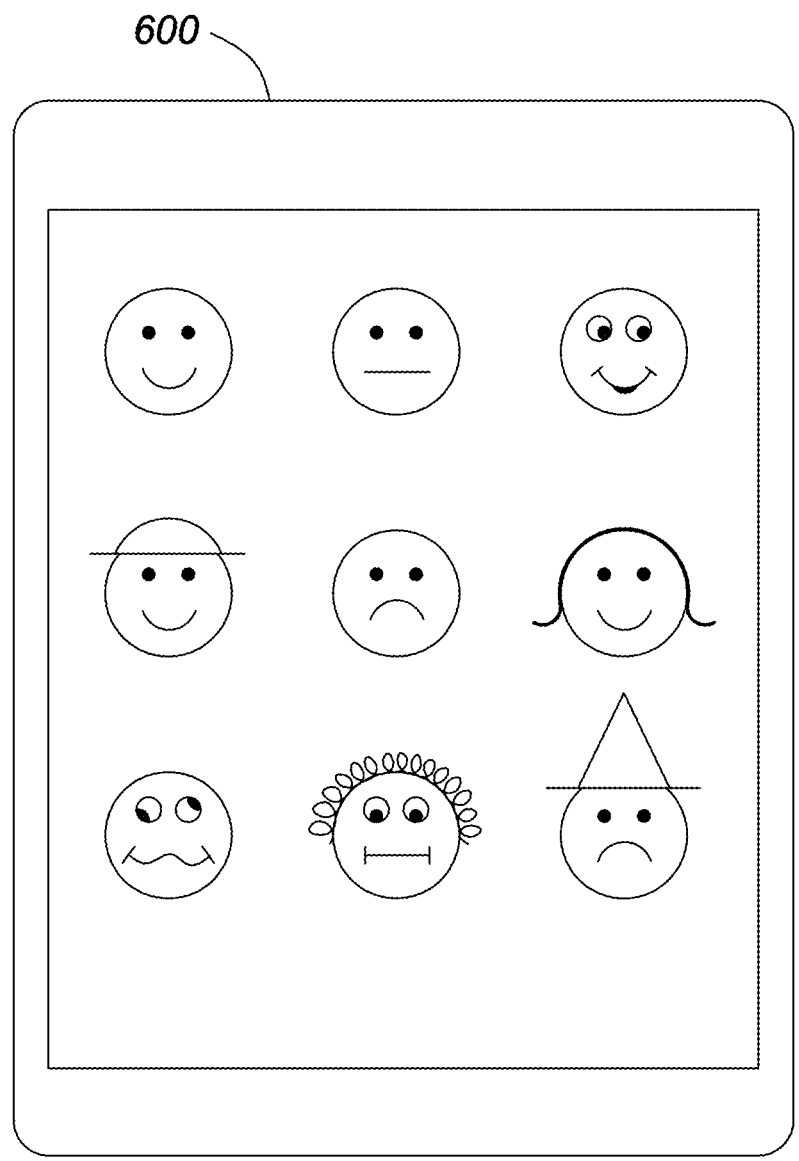
FIG. 6 is a screen shot of graphical objects displayed for authentication in accordance with one example embodiment of the present disclosure.

At action 410, the method starts with displaying a plurality of objects on a display screen, the plurality of objects comprising objects that have been pre-selected as part of a passcode, the passcode comprising a sequence of the pre-selected objects. In some embodiments, the passcode sequence is not ordered. In other words, the sequence may comprise a plurality of objects and to authenticate, the user must select a threshold number of the objects in any order. In other embodiments, the sequence is in a pre-selected order that must be maintained in the selection process in order to authenticate. The plurality of objects in some embodiments comprises objects not in the passcode, as well as the objects that are part of the passcode. Non-limiting examples of the objects include digits, alphanumeric characters, and graphical elements. By way of example, FIG. 5 is a display 500 where the objects are the digits 1 through 9 displayed in a random order at eight cardinal directions and at the center of the display. FIG. 6 is a display 600 where the objects are graphical elements. In this particular example, the graphical elements are smiley faces with different facial expressions. Other possibilities for graphical elements include, but are not limited to, objects of different geometric shapes and objects of different colours. It is to be understood that any number of objects can be used, as well as any combination of types of objects. For example, smiley faces and digits can be displayed at the same time. In another non-limiting embodiment, the objects include animations. In some embodiments, the objects are displayed as moving around the display screen. In embodiments, where the objects are moving, the speed of movement is determined by how quickly and accurately the direction of gaze can be determined. Factors in deciding how many objects to display include the size of the display and the precision which a direction of gaze can be determined. The sequence of the passcode is pre-selected. It is to be understood that the sequence can be of any length. One factor to consider in deciding how long to make the passcode are the length of time the authentication will take. Another factor to consider is the desired level of security. A longer passcode will provide a higher level of security than a shorter passcode. It is also to be understood that the passcode may include more than one occurrence of the same object.

The method then continues with actions 420 to 460 which are repeated for each object of the sequence of the passcode. At action 420, a trigger signal is received. In some embodiments, the trigger signal is an input for taking a photograph received from an input interface. In some embodiments, the input is the result of activation of the input interface, such as, but not limited to, a button on a keyboard, a button on a touch screen, a function key, a designated area of a touch screen and a touch pad. In some embodiments, a gesture, such as but not limited to a tapping on the device, is the input. The tapping could be registered by the device's accelerometer. In some embodiments, the input is a finger gesture on the touchscreen.

Triggering an image sensor to capture an image could also be done from a device accessory that is connected, for example through a short range wireless protocol (e.g., Bluetooth™), with the device. For example, in the case where the device, such as a tablet, is sitting upright in a docking station pressing a button on the accessory could trigger the camera. This would reduce the need to reach for or touch the electronic device during authentication. In some embodiments, the trigger signal is generated at a set time. In some embodiments, for example, a trigger signal can be generated at set intervals after the authentication process is initiated. For example, a user can initiate authentication by pressing a button and an image can be captured for each object of the sequence at a set interval, such as but not limited to 1 or 2 seconds. In some embodiments, the trigger signal is generated at a user-trained rate. For example, in setting up the passcode, the user can train to shift their gaze from one object to another and hold still until the image is taken.

In response to the trigger signal, at action 430 an image sensor is caused to capture an image. In some embodiments the image sensor is a camera. In some embodiments, the image is a photograph. In some embodiments, the image is captured in a direction opposing the display screen. In some embodiments, the image sensor is part of the computing device. In other embodiments, the image sensor is a peripheral device controlled by the processor executing the method. In some embodiments, the image is not displayed. This provides extra security in that an observer standing behind the user is not provided with an opportunity to see both the user's face in the image and the objects displayed on the display. In other embodiments, a copy of the image is displayed on a display. The copy could be displayed on the same display as the plurality of objects or a separate display. This permits the user to know if a good quality image, that is with the user's face centered within the photograph and in focus, has been taken. In other embodiments, a preview of the image is displayed so that the user can position himself or herself prior to activating the input interface. In some embodiments a single photograph or image is taken per activation of the input interface. In other embodiments, the image sensor captures a short sequence of images when the input interface is activated. While this might require slightly more computational power, and therefore more computational time and electrical power, it has the potential to make the authentication process more reliable and robust to errors caused by such things as eye saccades.

At action 440, the photograph is analysed to determine a direction of gaze. In some embodiments, this includes determining if there is a pair of eyes in the image. In some embodiments, this includes determining if there is a face in the image. This can be accomplished using any one of a number of pattern recognition methods available. In some embodiments, the method further comprises comparing a face of at least one of the images to images of faces of pre-authorized users and only indicating positive authentication if the face matches the face of an authorized user. In some embodiments, the face in the image must match a face in an image stored for the user attempting authentication. Existing facial recognition methods can be used to perform the comparison. In some embodiments, if the face in the image does not match the face of a pre-authorised user, the authentication method is ceased.

In some embodiments, this determination of direction of gaze is based on existing eye tracking algorithms, such as those used by Tobii Technology™ and by Takashi Nagamatsu, Michiya Yamamoto and Hiroshi Sato in their Mobigaze interface. However, in the present disclosure, the direction of gaze is determined from the image captured. It is not required to track eye movement prior to capturing the image, which would have required that the image sensor to be on continuously. In the method proposed, the image sensor only needs to be turned on for the capture of the image which uses less power than eye tracking methods that monitor eye movement on a continuous basis over a period of time. Furthermore, less processing is required to analyse the image than to capture and analyse the data required to track continuous eye movement. In some embodiments, one eye is analysed to determine direction of gaze. In other embodiments, two eyes are analysed to determine direction of gaze. In some embodiments, head tilt is used to determine direction of gaze. In some embodiments, a combination of analysing one or two eyes and head tilt are used. In some embodiments, the direction of gaze can differ from the direction of the head in the image.

Alternatively, the image can be analysed to determine if there is a face in the image and if there is a face in the image, the direction of gaze of eyes on the face is determined.

In some embodiments, the image is compared to template images previously captured of the user's face. For example, there can be a template image stored for each position on the display in which the objects are positioned in implementing the method. An example of creating an open eye template is discussed in Emiliano Miluzzon, Tianyu Wang, Andrew T. Campbell. Eye-Phone: Activating Mobile Phones With Your Eyes. In *Mobiheld* 2010, Aug. 30, 2010, New Delhi, India.

In some embodiments, direction of head tilt is used to aid in the determination of direction of gaze. For example, if the head in the image is tilted to the user's right, this can be an indication that an object on the left hand side of the display is intended to be selected. Likewise, if the head in the image is tilted upwards, an object at the top of the display is likely intended to be selected.

At action 450, the object on the display screen that corresponds to the direction of gaze is determined. It is to be understood that "corresponds to" does not have to be an exact match of the direction of gaze to the object on the display. In some embodiments, a margin of error is permissible, and a direction of gaze within a zone or area of the object will be interpreted as corresponding to the object. Then, at action 460, a determination is made as to whether the object that corresponds to the direction of the gaze matches the object in the sequence.

After the images have been analysed for all objects of the sequence, at action 470, a determination is made as to whether a threshold number of matches has been exceeded and if the threshold has been exceeded indicating positive authentication. Non-limiting examples of indicating positive authentication include: providing a visual indicator; providing an audible indicator; and allowing user access. The threshold can be set to be all of the sequence or a number less than all of the sequence. In some cases, less than all of the sequence is set as the threshold to allow for some inaccuracies. For example, one or more images taken may be out of focus or the user may be in a position in the image that does not allow for the determination of gaze. In a non-limiting example, if the sequence has a length of five, authentication may require only three matches.

In some embodiments, an input is received indicated that an image has been captured for each object of the sequence. For example, a specific button could be pressed or a button used to generate the trigger signal can be pressed twice. In other embodiments, the action 470 takes place after a preset number of image captures. For example, in some embodiments, the passcode comprises a preset number of objects, such as 3 or 4.

Another way to allow for inaccuracies is to keep updating a running probability that the user is entering the right login sequence. At the end of the login sequence, the user is granted access if this probability is higher than a pre-defined threshold. As an example, consider the login case described in FIG. 8 below (where the correct passcode is 5-2-7). First, the user is gazing at digit 5 when pressing the button. For each digit presented on the screen, the system can assign a probability that the digit is being selected by the user. In this case, after running its eye-tracking algorithm, it might assign a probability of 0.7 to digit 5, 0.2 to digit 2, 0.1 to digit 1 and 0 to all remaining digits (notice that overall the probabilities add to 1). The process continues with the selection of the next digit passcode. For this second step, the user is gazing at digit 2. Again, probabilities are assigned to each digit on the screen (say 0.8 to digit 2, and 0.2 to digit 6). At this stage, from the system's perspective, the probability that the user was looking at the correct 5-2 sequence is therefore 0.7*0.8=0.56. The system keeps updating this probability count for each digit of the passcode, and can then compare it to a pre-defined threshold at the end of the process.

In some embodiments, if the threshold of matches is not met, the method further comprises indicating that authentication failed. The indication that authentication failed in some embodiments is an audio signal. In some embodiments, the indication that authentication failed is a visual output on the display. In some embodiments, if authentication failed, the method starts over. In some embodiments, after a set number of failed authentication attempts, a user is locked out and not permitted to attempt authentication again. In some embodiments, the user is locked out until an administrator overrides the lock out. In other embodiments, the lock out is for a set time period.

In some embodiments the method further comprises timing the authentication attempt. If positive authentication is not indicated within a time limit, the method proceeds to indicating that authentication failed.

In some embodiments, if authentication fails, the computing device requires the user to enter an alpha-numeric password in a subsequent authentication attempt.

In some embodiments, the plurality of objects is displayed in a different order after each determination of whether the direction of the gaze corresponds to the object of the sequence. In other words, the objects are shuffled between each image.

In some embodiments, the plurality of objects is displayed in a random order. Thus, the user will not know prior to starting the authentication process where the first object of the sequence will appear on the display. This will make it more difficult for an observer to determine the passcode by observing the user's eyes alone. Even if the observer can determine that the user was looking up when the input interface was activated, the observer will not know what objects appear at the top of the display because the location varies with each authentication attempt.

In some embodiments, the method further comprises tracking relative position of the computing device after the image sensor captures the image and collecting position related data. In some embodiments, the position related data is used to determine change in position of the computing device from the image to a subsequent image. If there is a presumption that the user remained relatively still, this information about the relative position or orientation of the computing device can be useful in determining differences between the face in the images. In this manner the analysis of subsequent images can require less processing than the analysis of the first image in the authentication process as only the differences need to be processed. Over an amount of time that is comparable to a realistic time lapse between two consecutive button presses of the login process (for example, 2 to 3 seconds), an accelerometer can be quite good at tracking relative motion of the device. This means that embodiments of the system and method described herein can build a fairly reliable model of how much the original image that is captured will "change" over the period of time between two button presses. This information is valuable when computing speed is of the essence. For instance, having identified the location of the user's eyes in the first image, the system can focus on a subregion of the second image, where it would expect to find the user's eyes, based on their position in the original image and on how much the device has moved.

One way to track relative position is to use an accelerometer on the computing device. This is useful with mobile devices. Data collected from the accelerometer can be used to determine if the direction and distance the mobile device changed between images. Likewise, a digital compass can be used to track relative position. A digital compass generally comprises a magnetometer and an accelerometer.

As mentioned above, the analysis of the image to determine the direction of gaze is based, in some embodiments, on existing eye-tracking techniques. One such technique is Pupil Centre Corneal Reflection (PCCR) which is used by Tobii Technology. In this technique a light source illuminates the eye causing reflections off the cornea and the pupil which are captured by a camera along with an image of the eye. Thus, in some embodiments of the methods disclosed herein analysing the images using a technique based on PCCR, the image sensor includes a light source, such as but not limited to an infrared light or near infrared source, and a flash. Image processing algorithms are used to calculate the position of the eye and point of gaze based on the image of the eye and the reflection pattern, the position of the light source relative to the eye, and the position of the object upon which the eye is looking.

Figure 7:
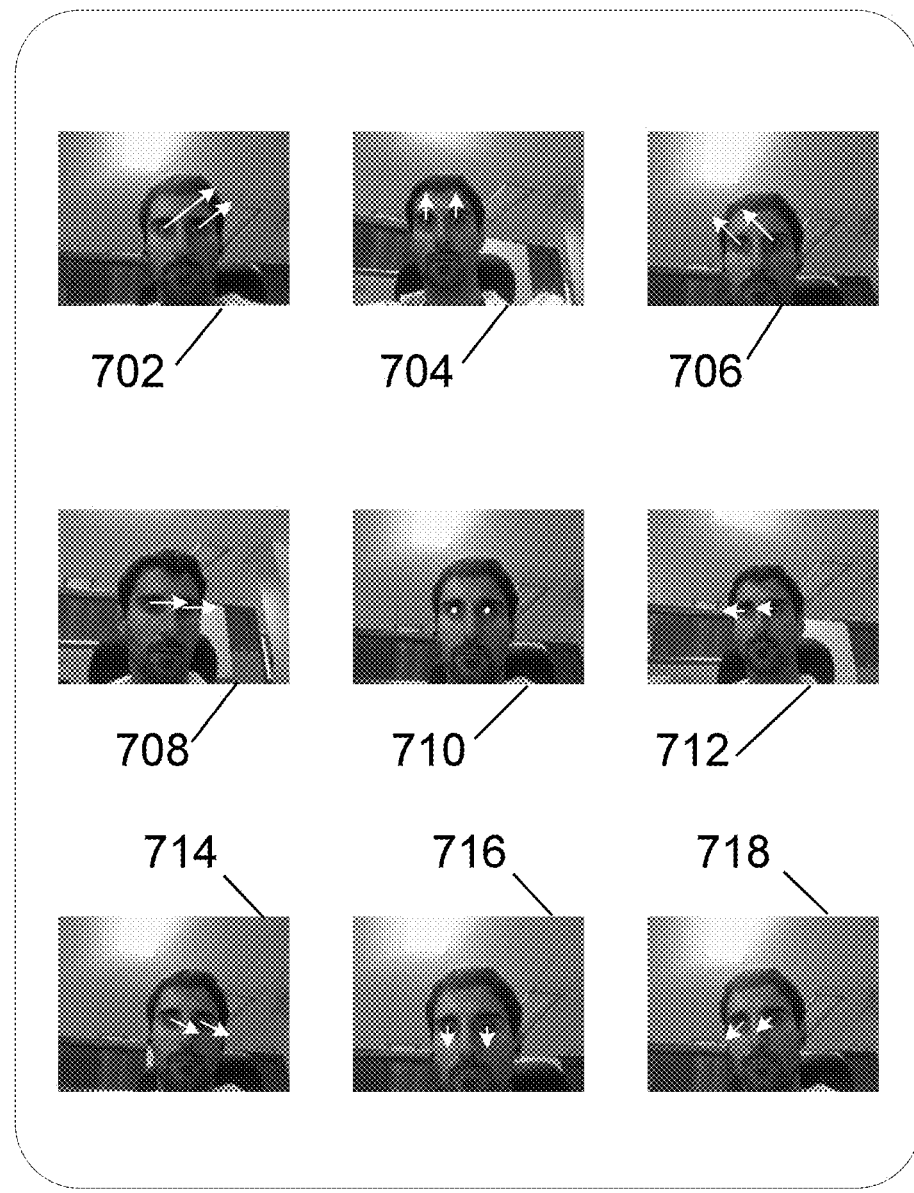
FIG. 7 is a series of photographs illustrating one example embodiment of the present disclosure.

FIG. 7 is a pictorial illustration of a series of images for an implementation with nine objects displayed in three rows and three columns. For illustrative purposes only gaze vectors are added to the images to show what direction of gaze would be determined for each image at action 445 of the above-described method. Also for illustrative purposes, the nine images are placed at the position on a display that would be interpreted as being the location corresponding to the direction of gaze of the face in the image. Thus, in FIG. 7, the image 702 at the top left corner having gaze vectors pointing to the right and upwards would be interpreted as gazing in the direction of the top left corner of the display. The image 704 at the top center having gaze vectors pointing upwards would be interpreted as gazing in the direction of the top center of the display. The image 706 at the top right corner having gaze vectors pointing to the left and upwards would be interpreted as gazing in the direction of the top right corner of the display. The image 708 at the left side of the middle row having gaze vectors pointing to the right would be interpreted as gazing in the direction of the left side of the middle row of the display. The image 710 at the center of the center row having gaze vectors pointing straight ahead would be interpreted as gazing in the direction of the center of the display. The image 712 at the right side of the middle row having gaze vectors pointing to the left would be interpreted as gazing in the direction of the right side of the middle row of the display. The image 714 at the bottom left corner having gaze vectors pointing to the right and downwards would be interpreted as gazing in the direction of the bottom left corner of the display. The image 716 at the bottom center having gaze vectors pointing downwards would be interpreted as gazing in the direction of the bottom center of the display. The image 718 at the bottom right corner having gaze vectors pointing to the left and downwards would be interpreted as glancing in the direction of the bottom right corner of the display.

Figure 8:
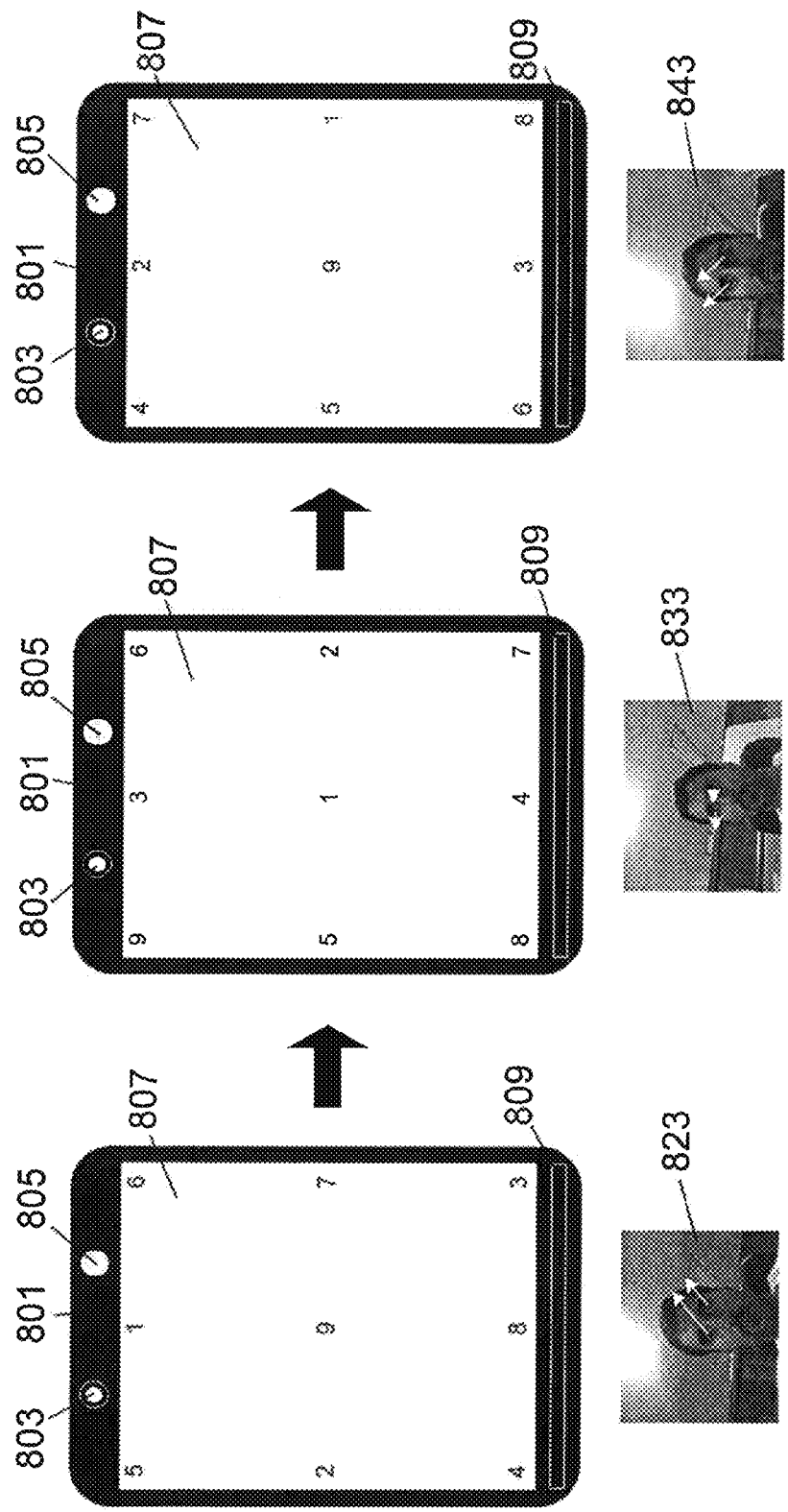
FIG. 8 is a pictorial illustration of one example embodiment of the present disclosure.

An example of authenticating for a login sequence with a passcode of 5-2-7 will now be described with reference to FIG. 8. Images of a computing device 801 and images taken of the user for each digit of the login sequence are shown. The computing device 801 of this example is a mobile computing device with a front-facing camera 803, a light source 805, a display 807 and a push button 809. Non-limiting examples of the push button 809 are a mechanical button, a touch pad, a touch sensitive area of a touch screen and a touch sensitive area of the display 807. In the image at the left of the figure, "5" is displayed at the top left corner of the display. Eight other digits are randomly displayed so that there are three columns and three rows of digits displayed. In the corresponding image 823 the user's gaze is to the top right, indicating selection of the digit at the top left corner of the display. Therefore, a match for the first digit of the sequence is determined. In the middle image of the computing device 801, the digit "2" is displayed in the center row of the right hand column of the display. In the corresponding image 833, the direction of the use's gaze is to the left, indicating selection of the digit located in the center row of the right hand column. Therefore, a match for the second digit of the sequence is determined. In the image of the computing device 801 at the right hand side of FIG. 8, the digit "7" is located at the top right corner of the display 807. In the corresponding image, the direction of the user's gaze is to the top left indicating selection of the digit located at the top right corner. Therefore, a match for the third digit of the sequence is determined. Because there were matches for all three digits of the sequence, positive authentication is achieved. For illustrative purposes, arrows are shown on the images to show the direction of gaze. It is to be understood that such arrows are not necessary in implementation.

Figure 9:
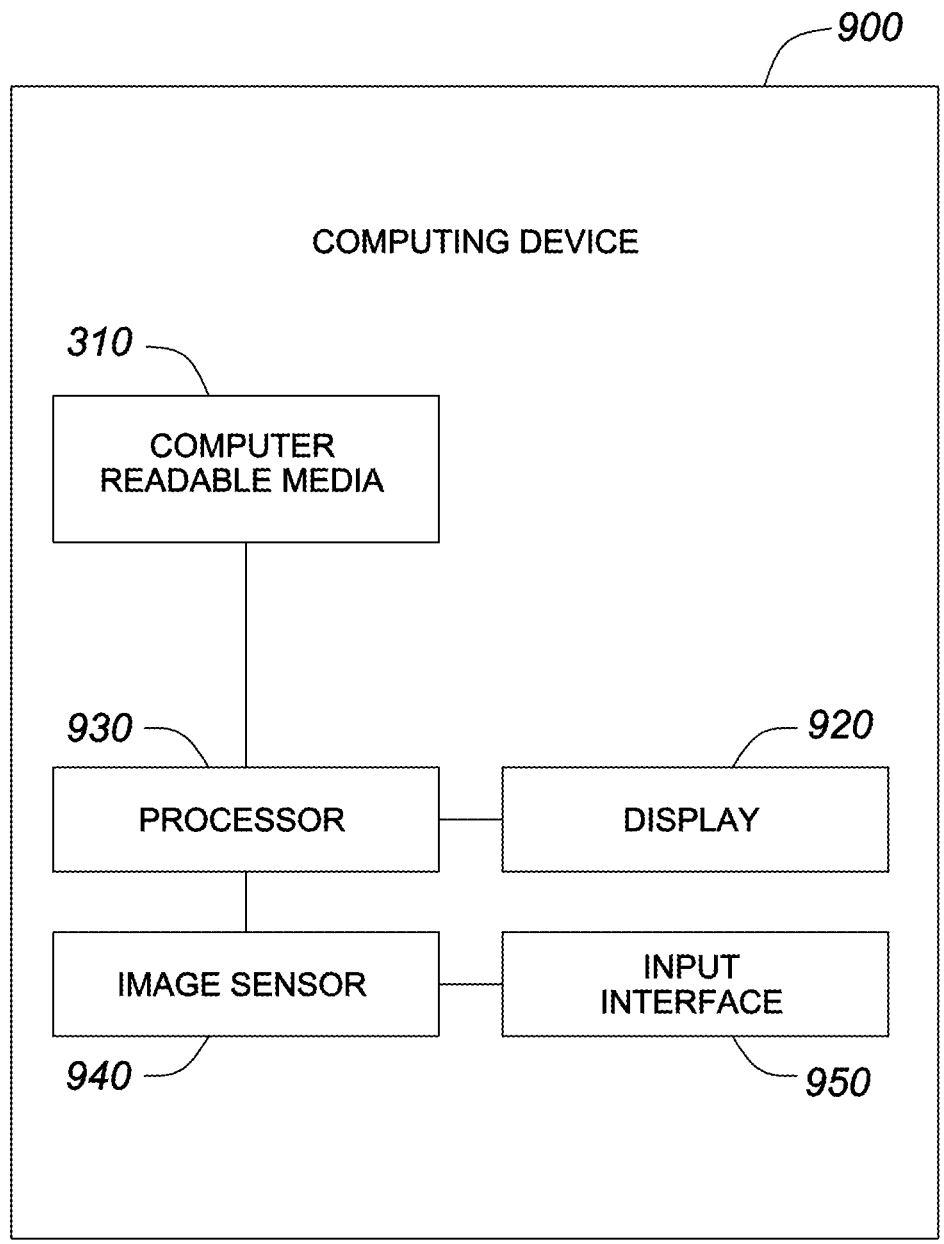
FIG. 9 is a block diagram of a computing device in accordance with an example embodiment of the present disclosure.

Referring to FIG. 9, a computing device 900 will be described. In some embodiments the computing device 900 is a mobile communications device such as the mobile device 201 described herein. However, it is to be understood that the computing device 900 can be any computing device. Non-limiting examples include a personal computer, laptop computer, tablet device, a gaming system, personal digital assistant (PDA), mobile telephone, smart phone, bank machine, an access device for allowing access to a building or room, and an electronic controller for controlling systems or equipment.

The computing device 900 comprises the computer readable media 310, a display 920, a processor 930, an image sensor 940 and an input interface 950 for causing the image sensor to capture an image. The display 920 is used to display the plurality of objects. The processor 930 executes the instructions. In some non-limiting embodiments, the image sensor is a camera. The computing device 900, in some embodiments also comprises a flash memory on which the authentication module is located.

In some embodiments, the computing device 900 further comprises a motion detecting device to track relative position of the computing device after the image sensor captures the image and to collect position related data. Non-limiting examples of the motion detecting device include an accelerometer, a digital compass and a motion detector.

Non-limiting examples of the input interface 950 include a touch sensitive interface; a mechanical button and a key on a keyboard.

In some embodiments, the computing device 900 further comprises a light source.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a prerecorded storage device or other similar computer readable medium including program instructions recorded thereon may direct an apparatus to facilitate the practice of the described methods. It is understood that such apparatus, articles of manufacture also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. One or more non-transitory computer readable media having computer readable instructions stored thereon for user authentication at a computing device, the instructions when executed by a processor direct the computing device to:
 display a plurality of objects on a display screen, the plurality of objects comprising objects that are part of a passcode, the passcode comprising a plurality of objects;
 generate a plurality of trigger signals at set intervals;
 in response to each trigger signal, cause an image sensor to capture an image;
 analyse each image to,
  determine a direction of gaze;
  determine the object on the display screen that corresponds to the direction of gaze; and
  determine whether the object that corresponds to the direction of the gaze matches an object in the passcode; and
 after the images have been analysed, determine if a threshold for matches has been exceeded and if the threshold has been exceeded indicate positive authentication.

2. The one or more non-transitory computer readable media of claim 1 wherein the plurality of trigger signals are generated in response to receiving an input to initiate authentication.

3. The one or more non-transitory computer readable media of claim 1 wherein the plurality of trigger signals are generated at user-trained intervals.

4. The one or more non-transitory computer readable media of claim 1 wherein the instructions further direct the computing device to compare a face of at least one of the images to images of faces of pre-authorized users and only indicate positive authentication if the face matches the face of an authorized user.

5. The one or more non-transitory computer readable media of claim 1 wherein the instructions further direct the computing device to display the plurality of objects in a different order after each image capture.

6. The one or more non-transitory computer readable media of claim 1 wherein the passcode comprises a sequence of objects.

7. The one or more non-transitory computer readable media of claim 1 wherein the method further comprises tracking relative position of the computing device after the image sensor captures the image and collecting position related data and using the position related data to determine change in position of the computing device from the image to a subsequent image.

8. The one or more non-transitory computer readable media of claim 1 wherein the instructions direct the computing device to determine if the threshold is exceeded by determining if a minimum number of matches has been exceeded.

9. The one or more non-transitory computer readable media of claim 1 wherein the instructions direct the computing device to determine if the threshold is exceeded by determining if a minimum probability of matches has been exceeded.

10. A method of user authentication at a computing device, the method comprising:
  displaying a plurality of objects on a display screen, the plurality of objects comprising objects that are part of a passcode, the passcode comprising a plurality of objects;
  generating a plurality of trigger signals at set intervals;
  in response to each trigger signal, causing an image sensor to capture an image;
  analysing each image to,
    determine a direction of gaze;
    determine the object on the display screen that corresponds to the direction of gaze; and
    determine whether the object that corresponds to the direction of the gaze matches an object in the passcode; and
  after the images have been analysed, determining if a threshold for matches has been exceeded and if the threshold has been exceeded indicating positive authentication.

11. The method of claim 10, further comprising receiving an input to initiate authentication prior to generating the plurality of trigger signals.

12. The method of claim 10, wherein generating the plurality of trigger signals at set intervals comprises generating the plurality of trigger signals at user-trained intervals.

13. The method of claim 10, further comprising comparing a face of at least one of the images to images of faces of pre-authorized users and only indicating positive authentication if the face matches the face of an authorized user.

14. The method of claim 10, comprising displaying the plurality of objects in a different order after each image capture.

15. The method of claim 10, further comprising tracking relative position of the computing device after the image sensor captures the image and collecting position related data.

16. The method of claim 15, further comprising using the position related data to determine change in position of the computing device from the image to a subsequent image.

17. A computing device comprising:
  a processor;
  a display;
  an image sensor;
  an input interface; and
  one or more computer readable media having computer readable instructions stored thereon for user authentication at the computing device, the instructions when executed by a processor direct the computing device to:
  display a plurality of objects on a display screen, the plurality of objects comprising objects that are part of a passcode, the passcode comprising a plurality of objects;
  generate a plurality of trigger signals at set intervals;
  in response to each trigger signal, cause an image sensor to capture an image;
  analyse each image to,
    determine a direction of gaze;
    determine the object on the display screen that corresponds to the direction of gaze; and
    determine whether the object that corresponds to the direction of the gaze matches an object in the passcode; and
  after the images have been analysed, determine if a threshold for matches has been exceeded and if the threshold has been exceeded indicate positive authentication.

18. The computing device of claim 17, wherein the plurality of trigger signals are generated in response to receiving an input at the input interface to initiate authentication.

19. The computing device of claim 17, wherein the plurality of trigger signals are generated at user-trained intervals.

20. The computing device of claim 17, further comprising a motion detecting device to track relative position of the computing device after the image sensor captures the image and to collect position related data.

* * * * *